(12) United States Patent
Merritt

(10) Patent No.: US 6,458,440 B1
(45) Date of Patent: Oct. 1, 2002

(54) SPACER MATERIALS

(76) Inventor: Adrian Llewellyn Merritt, 3 Prosper Meadow, Kingswinford, West Midlands (GB), DY6 8BA ( * ) Notice: Subject to any disclaimer, the term of this patent is extended or adjusted under 35 U.S.C. 154(b) by 0 days.

(21) Appl. No.: 09/010,922

(22) Filed: Jan. 22, 1998

(30) Foreign Application Priority Data

Jan. 23, 1997 (GB) .............................................. 9701329

(51) Int. Cl.⁷ ................................................. B32B 7/14
(52) U.S. Cl. ...................... 428/40.1; 206/448; 206/454; 428/42.1; 428/42.2; 428/42.3; 428/43; 428/192; 428/194; 428/201; 428/202
(58) Field of Search ............... 428/40.1, 42.1, 428/43, 192, 194, 42.2, 42.3, 201, 202; 206/448, 454

(56) References Cited

U.S. PATENT DOCUMENTS

| | | | | |
|---|---|---|---|---|
| 2,292,024 A | * | 8/1942 | Dreher ....................... | 428/42.1 |
| 3,896,246 A | * | 7/1975 | Brady ....................... | 428/42.2 |
| 4,587,152 A | | 5/1986 | Gleichenhagen et al. ... | 428/195 |
| 4,747,681 A | * | 5/1988 | Brower ....................... | 428/40.1 |
| 4,806,404 A | | 2/1989 | Cascino ........................ | 428/40 |
| 4,899,880 A | | 2/1990 | Carter ....................... | 206/448 |
| 4,927,023 A | | 5/1990 | Elzey .......................... | 206/523 |
| 5,196,871 A | * | 3/1993 | Tom ............................ | 351/132 |
| 5,340,629 A | | 8/1994 | Rodighiero ................... | 428/40 |
| 5,593,756 A | | 1/1997 | Miller ......................... | 428/194 |
| 5,622,761 A | * | 4/1997 | Cole .......................... | 428/42.1 |
| 5,626,931 A | * | 5/1997 | Luhmann .................... | 428/42.1 |

FOREIGN PATENT DOCUMENTS

| | | |
|---|---|---|
| DE | 1035295 | 3/1956 |
| DE | 2157567 | 6/1972 |
| DE | 2801188 | 7/1979 |
| GB | 1149498 | 4/1969 |
| GB | 2145640 | 4/1985 |
| WO | 9420584 | 9/1994 |
| WO | 9516754 | 6/1995 |
| WO | 9616881 | 6/1996 |
| WO | 9707172 | 2/1997 |

* cited by examiner

*Primary Examiner*—Nasser Ahmad

(57) ABSTRACT

A spacer adapted, in use, to space materials, (for example sheets of glass) comprising a spacer element having on at least one face an adhesive wherein at least a portion of the edge of said adhesive carrying face is adhesive free. The spacer is fabricated from a relatively flexible material so that the portion which does not adhere to the material being spaced (because there is no adhesive on that portion) can be bent from out of the plane of the spacer. Once the unadhered portion is so bent a finger hold is provided.

19 Claims, 5 Drawing Sheets

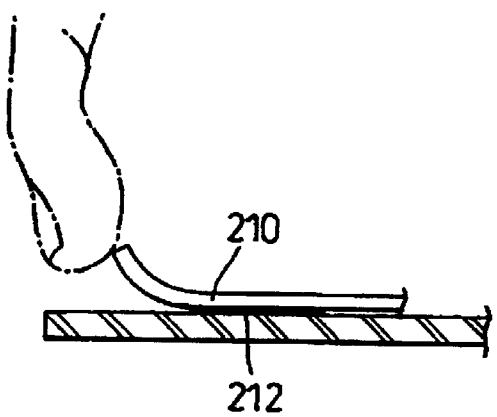
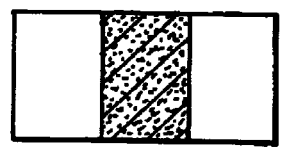
Fig. 6(a)  Fig. 6(b)
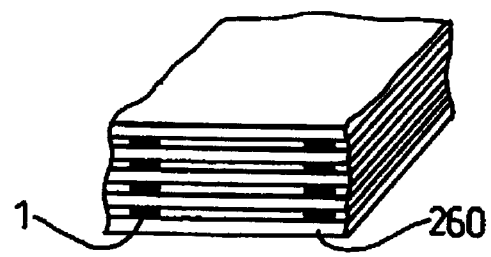
Fig. 7
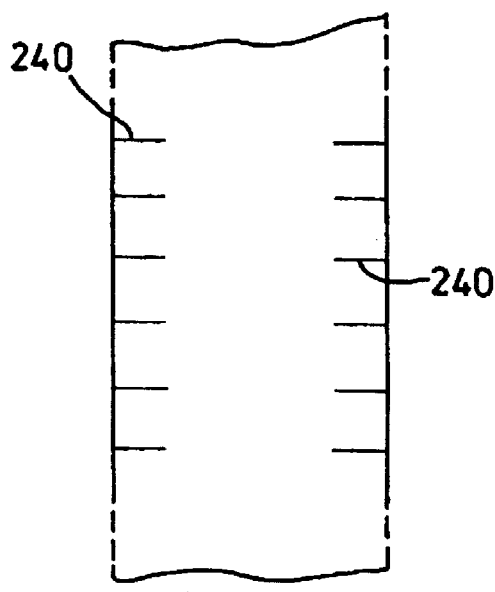
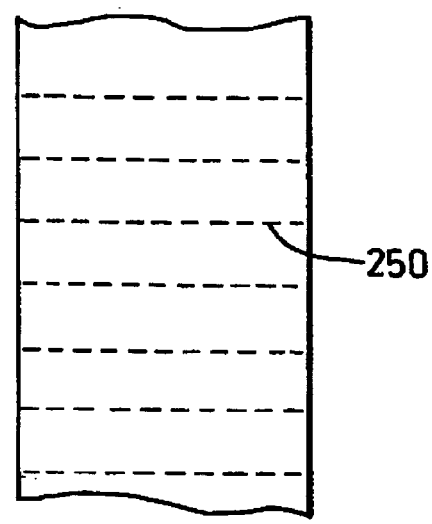
Fig. 8(a)  Fig. 8(b)

SPACER MATERIALS

This invention concerns improvements in and relating to materials, particularly but not exclusively of the type used to space glass and other materials during handling storage and transportation, particularly those of sheet form.

BACKGROUND OF THE INVENTION

Glass sheets arrive from the manufacturers in stacks of sheets of one size in a purpose built frame. However, during subsequent processing and handling spacing elements are used to keep the individual glass element apart with a view to easing handling and avoid damage due to relative movement or foreign bodies being caught between sheets.

As many sets of spacers may be required during the overall process life of the glass spacers must be cheap to produce; and not damage the glass as well as offering suitable padding levels. Above all the spacers must be easily applied and removed.

A number of different materials can and have been employed as spacers.

Amongst the earliest techniques was the introduction of a piece of paper between the sheets. However, paper offers limited crush resistance or padding and is awkward to handle.

As an alternative the provision of spacers as a series of discrete blocks which are placed at various locations on the glass has been used. A number of such spacer types exist, such as cork and PVC composites or a foam pad. When applied without an adhesive on one side to hold the pad in position the spacer frequently and inconveniently falls off. When provided with an adhesive the spacer sometimes bonds too well and is difficult to remove, decreasing productivity.

SUMMARY OF THE INVENTION

It is an aim of the present invention to meet these objectives whilst providing a spacer which can easily be introduced to and removed from its location of use.

According to a first aspect of the invention we provide a spacer adapted, in use, to space materials comprising a spacer element the spacer element having on at least one face an adhesive wherein at least a portion of the edge of said adhesive carrying face is adhesive free.

In this way a finger or other means employed to remove the spacer can easily do so as a portion of the edge is easily liftable relative to the spaced element.

The spacer is preferably sufficiently flexible that a part of it (e.g. a non-adhesive peripheral portion) can be bent out of the plane of the remaining, bonded, part of it so as to assist in gripping the spacer to remove it. Thus a "fingerlift" edge portion is provided.

Preferably the adhesive is provided in one or more stripes. An easy manner for introducing the adhesive is thus allowed. Most preferably the stripes are substantially perpendicular to an edge of the spacer. This gives regular positioning of the adhesive on a series of spacers.

The adhesive may be provided in a central portion of the spacer, so providing a large amount of edge free. Alternatively, or additionally, the adhesive may follow one or more edges, leaving one or more other edges or portions thereof, free.

The adhesive carrying areas themselves may consist of a continuous or discontinuous layer of adhesive. Thus the adhesive may be provided as dots, cross-hatching or the like to give the desired degree of adhesion and level of adhesive use.

According to a second aspect of the invention we provide a method of manufacturing a plurality of spacers comprising:
a) forming the spacer material
b) applying continuous discontinuous adhesive to the spacer material
c) cutting the spacer material into a plurality of spacers, wherein one or more of the cut edges of the spacer includes a portion of spacer material which is free of adhesive.

In this way the fingerlift function is achieved as a "dry edge" is provided.

Steps b) and c) may be reversed whilst achieving the same result.

Preferably each spacer generated has an edge portion without adhesive but a degree of wastage is acceptable.

Preferably the adhesive is applied in stripes. Most preferably the application is parallel to the direction of advancement of the spacer material through the adhesive applying stage.

The adhesive may be applied in stripes between three quarters and a fifth of the width of the spacer to be cut although the adhesive may be wider or narrower. An equivalent or larger or smaller width may be provided between adjacent adhesive stripes or adhesive free areas. The effect may be achieved by multiple stripes or other form of discontinuous adhesive (e.g. dots)

Whilst an adhesive may be applied to the spacer as a continuous covering alternatively it may be in a discontinuous form, such as a pattern, series of dots or strips which may aid the use or manufacture as well as reducing manufacturing costs. The use of discontinuous adhesives is particularly advantageous where it is desired to apply the spacer by means of semi-automatic or automatic dispensers as are currently employed on production lines or in other continuous manufacturing environments.

Particularly preferred type of adhesives are the pressure-sensitive types which will readily hold the component in place during use but will easily and cleanly remove from the glass and/or other material when no longer required.

The spacer may have its adhesive covered by protective release paper to aid manufacture of the pads and dispensing and eventual use/application of same.

By cutting spacer material into the required size during manufacture and using external glue to join adjoining sheets a spacer material or layers of a roll of spacer material temporarily, the product can economically be provided in easily handled form.

Alternatively the externally applied adhesive may be incorporated into the manufacture of the spacer material. Such an adhesive may be applied prior to or when cutting the spacer material to make rolls or sheets of spacers.

When supplied in rolls, the product may be provided in various lengths and widths as necessary to ease its use with specialist application equipment or by hand. Where such equipment is used, the dispensers themselves may serve to cut the spacers at the required size and/or apply them to the glass and or other materials.

Where a backing is provided the die may cut through the spacer material and leave the backing intact.

Preferably the die cuts through the spacer material and partly cuts the backing material providing a construction which allows lengths of product to be removed from a roll.

The partial cutting may comprise providing a cut at either side of the backing material. Alternatively, it may comprise providing perforations or cuts across the width of the backing material.

In another embodiment of the present invention there is provided a stack of two or more sheets of glass (or other material) wherein each sheet is separated by one or more spaces according to the first aspect of the invention.

In yet another embodiment of the present invention there is provided a sheet of material having a first and second face, the sheet having on at least one of the faces a number of stripes of glue, the sheet being adapted, in use, to be cut into spacers according to the first aspect of the invention.

BRIEF DESCRIPTION OF THE INVENTION

Embodiments of the invention will now be described, by way of example only, with reference to the drawings in which:

FIGS. 6a and 6b show schematically the invention is use;

FIG. 7 shows a stack of sheet glass separated by spacer;

FIG. 8a shows an underneath view of a backing sheet according to the present invention;

FIG. 8b shows an underneath view of a different embodiment of the invention from that shown in FIG. 8a.

DETAILED DESCRIPTION

Figure 1:
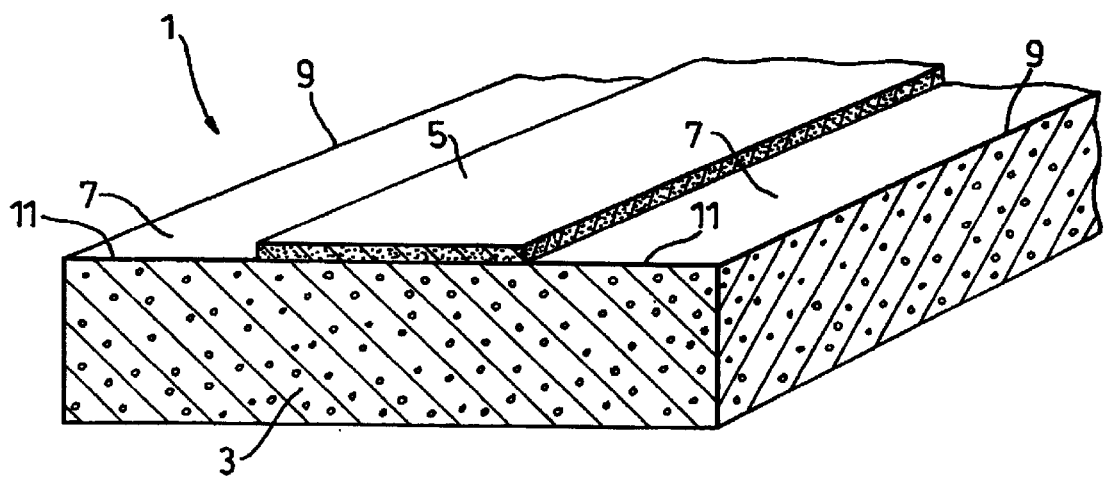
FIG. 1 shows an embodiment of a spacer according to the first aspect of the invention.

As illustrated in FIG. 1, a spacer 1 is formed from a spacer element 3 together with an adhesive material 5.

The spacer element 3 may be a single layer foam, cork or other material or consist a composite of one or more such materials.

By providing a discontinuous adhesive and/or a stripe of adhesive 5 dry areas 7 are provided around the edge of the spacer 1. Thus a finger could easily lift edge portions 9, 11 and peel off the spacer whilst otherwise the adhesive layer 5 maintains the spacer's position. The spacer is flexible and so its dry edge 7 can be lifted up, whilst adhesive region 5 is still bound to the glass. If means other than fingers (e.g. blade) are to be used to remove the spacer, the free edge also assists in their insertion.

Figure 2A:
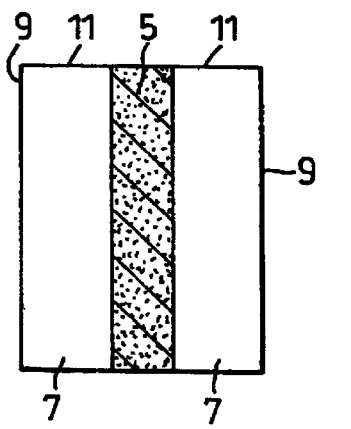
FIGS. 2a to 2e illustrates a number of other such embodiments.
Figure 2B:
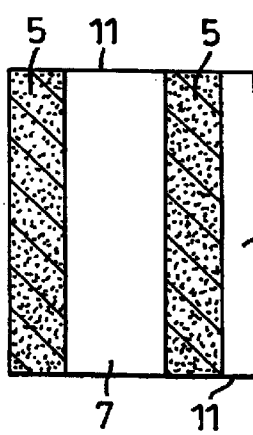
Figure 2C:
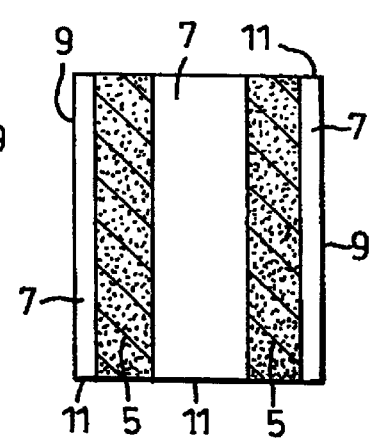

FIGS. 2a–c illustrate produce spacers 1 (e.g. spacers for sheet glass) having stripes of adhesive 5 in the manner of FIG. 1. The variation in position of the stripes reflects variation in the centring of the stripe or the spacer relative to the cutting but demonstrates that, even so, free edges 9, 11 are generated.

Figure 2D:
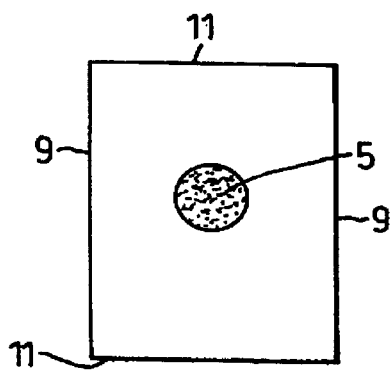
Figure 2E:
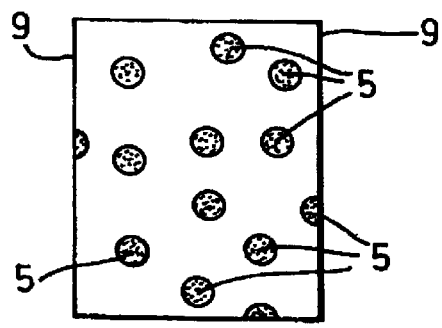

FIGS. 2d–e illustrate alternative patterns of adhesive 5 whilst still giving free edges 9, 11.

Preferably the adhesive layer 5 is a pressure sensitive self adhesive which is readily removable from glass. If desired a release paper layer or other backing sheet may be provided over the adhesive layer 5 to isolate the adhesive during storage.

To aid in storage, and also in subsequent deployment of the spacers it is desirable that they be cut through to at least some extent during formation. Thus dies stamp or other means can be used to cut the material of the spacers into blocks of the desired size for subsequent use. Ideally the material is cut completely through or only retained together by means of a relatively small proportion of the material. This relatively small portion can be broken when the element is needed for use.

Figure 3:
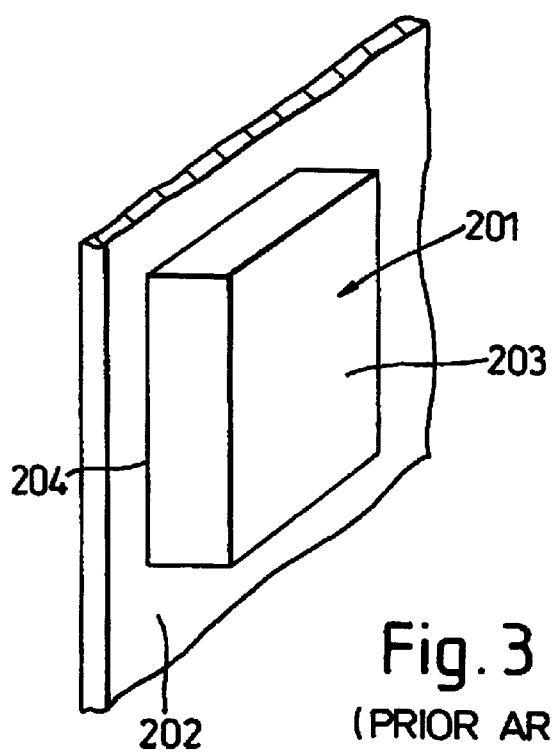
FIG. 3 shows a prior art spacer in use.

The prior art shown in FIG. 3 shows a spacer 201 in situ on a section of glass 202 which is to be spaced from a further section of glass (not shown). The spacer 201 comprises a block of foam-like material 203 which is held in position on the glass by means of an adhesive layer 204.

In use the spacer 201 is taken from its storage position and a layer of paper backing is removed to expose the layer of adhesive 204. The adhesive 204 is then brought into contact with the glass 202 and is retained in position relative to it by adhesive action. The second member of glass is then brought into contact with the spacer 201 potentially resulting in the spacer 201 being compressed by the weight of glass.

Once the glass has been moved to the next location in which it is to be processed, cut or otherwise used, the glass members are separated and the spacers 201 removed. If any adhesive 204 remains on the glass it is desirable that it can be readily removed by conventional solvents and/or cleaners.

It can be difficult to prise off a prior art spacer, especially if it has been compressed for some time by the weight of a stack of sheets of glass.

Figure 4:
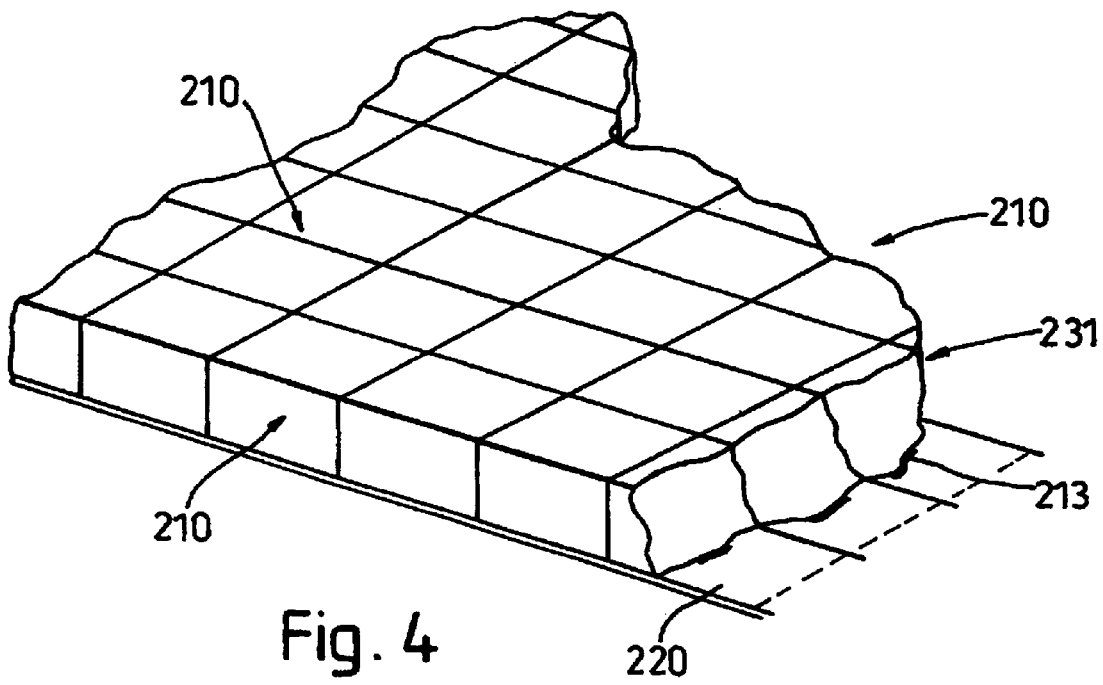
FIG. 4 shows a section of sheet of spacers of the present invention.
Figure 4A:
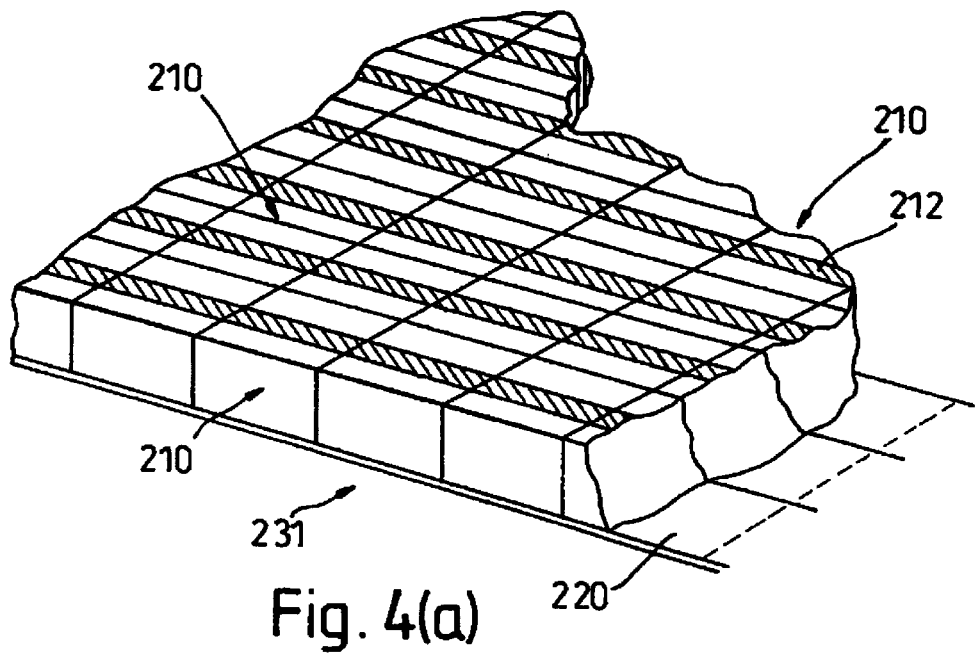
FIG. 4a shows a section of a sheet of spacers of another embodiment of the present invention.

FIGS. 4 and 4a show parts of a sheet of spacers 210 produced in accordance with the present invention. The spacers 210 are manufactured on a backing sheet 220. The backing sheet 220 is fed into the manufacturing process and the foam spacer element forming material is introduced onto this backing sheet 220 in the required amount to form the spacer element 210 of the required thickness. As the backing sheet 220 is introduce to the material, strips of adhesive 213 can be introduced between the two. Alternatively (as shown in FIG. 4a) strips of adhesive can be provided on a side of the material opposite the backing sheet. The strip of adhesive may have previously been applied to the release paper or backing sheet or laminated onto the spacer material.

It is possible that heat treatment and/or die cutting could be used to further form the spacer element 210. In this way a sheet is formed which requires cutting into the desired size for the given space application. A number of sheets may be stacked upon one another prior to the cutting stage and/or after cutting. Cutting is effected by way of dies which are designed to cut through the material in total or leave only the top and/or bottom intact or perforated. Sheets produced by one way are illustrated in FIG. 4 and provide a readily handleable way of presenting the spacers.

Figure 5:
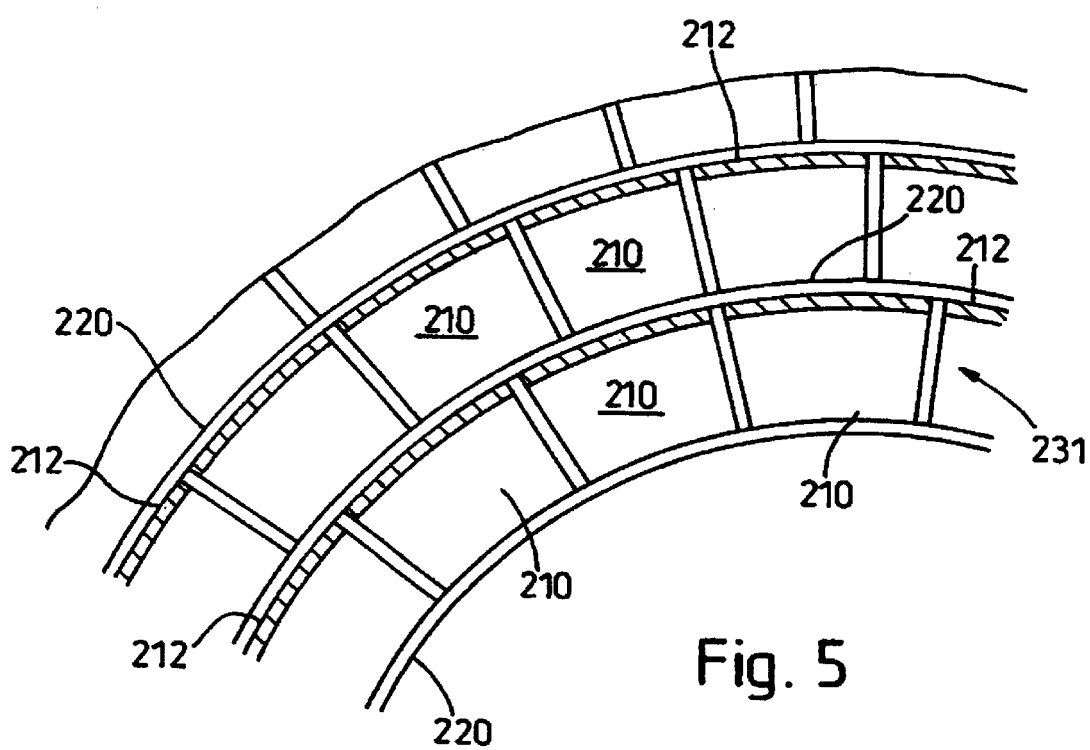
FIG. 5 shows a section of a roll of spacers ready for use.

FIG. 5 shows the sheet of spacers of FIG. 4 in a roll.

By providing a layer of adhesive 212 on the spacer materials 210 but without providing a release paper covering for this external adhesive, then sheets 231 can be stacked or, alternatively, as shown in FIG. 5, they can be rolled with the adhesive layer 212 ensuring that the coherence of the stack or roll is maintained. Thus a roll of spacers 210 one spacer wide can be cut but the roll will stay together due to the adhesive interaction between adjoining spacers and/or the joined nature of one or more of the layers.

I could also use the invention in relation to plastics glazing frames such UPVC window frames (or door frames) or other materials/parts, perhaps sheets of metal. These also need spacing from each other in transit and experience similar problems, including difficulty in removing spacers. The protection I am seeking includes spaced frames, and the application to the invention to spacing frames. It also includes the application of the invention to: glazed units— frames with glass in and protection during transit and installation; sheets of glass prior to and post processing; glazed units; window frames; window frames with units in; other materials including metal formed parts (e.g. metal partitioning, metal dies, other metal and non-metal components).

As shown in FIG. 8a cuts 240 may be provided so that backing/strip release paper can easily be torn in strips from a roll. That is the strip/release paper may tear between the cuts. The cuts 240 are provided level one another at opposite sides of the backing strip/release paper. (Alternatively, they may not be level with one another).

As shown in FIG. 8b the backing strip/release paper has been perforated width ways 250 so that it can easily be torn in strips (perhaps from a roll as shown in FIG. 5).

As shown in FIG. 7 a number of sheets of glass 260 can be separated by a number of spacer elements 1.

Figure 9:
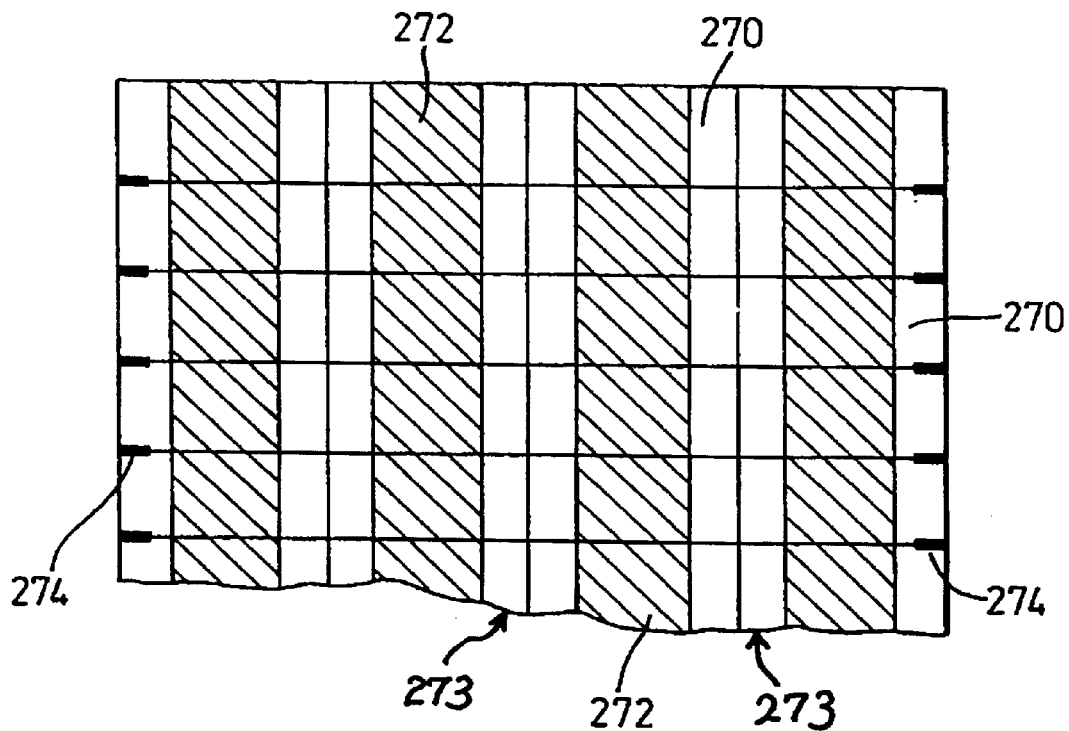
FIG. 9 shows a schematic view of a further embodiment of the invention.

In one embodiment the spacers are provided in a sheet or roll form with stripes of adhesive between a foam spacer material and a release paper. This is shown in FIG. 9 wherein the spacers 270 are shown by each rectangle, the stripes of adhesive 272 by the shaded stripes and the adhesive free areas at 273. Cuts 274 are provided at either side of the release paper in a similar manner as in FIG. 8a. It should be noted that the cuts do not protrude into the adhesive stripes 272. It has been found that if the cuts do protrude into the adhesive the release paper may tear in an uncontrolled manner and makes the spacer difficult to remove from the release paper. (Of course, in other embodiments the cuts may be made to protrude into the adhesive stripes).

What is claimed is:

1. A sheet of a plurality of glass sheet spacers attached to a common backing film said spacers comprising resilient foam bodies having an adhesive-carrying surface comprising a continuous unstepped surface having an adhesive-free portion adjacent an adhesive-carrying portion, adhesive provided at said adhesive-carrying surface of said spacers between said adhesive-carrying portions and said backing film, said adhesive is removable adhesive and said spacers having a second surface spaced from said adhesive-carrying surface by the thickness of said spacers and extending generally parallel to said adhesive-carrying surface and being adhesive free; wherein said spacers are disposed on said common backing film in a grid pattern with a plurality of spacers in one direction of the grid and a plurality of spacers in a transverse direction of the grid, and wherein each said spacer has said adhesive-free portion provided on a flexible finger-lift part of said spacer and at an edge thereof and wherein said spacer has said adhesive-free portion being flexible enough such that when said spacers are attached to a flat glass sheet surface in use a person can bend or roll said finger-lift part of said spacer upwards out of the plane of said adhesive-carrying portion with a finger, thereby facilitating a rolling-off action and/or manual gripping of said finger-lift part of said spacer whilst said adhesive-carrying portion of said spacer is still in contact with said flat surface.

2. A sheet according to claim 1 wherein said sheet is flat.

3. A sheet according to claim 1 wherein said sheet is formed into a roll.

4. A sheet according to claim 1, wherein said backing film has generally parallel spaced apart first and second side edge regions and a central region disposed between said side regions, and wherein rows of longitudinally spaced pairs of aligned slits or perforation lines are provided through the backing film at said first and second side regions, each pair of slits or perforation lines comprising one slit or perforation line at said first side edge region and another said slit or perforation at said second side region, the slits or perforation lines of a pair extending towards each other on the same line transverse to the side edges of said first and second side edge regions, and wherein said central region of said backing film is unslit and unperforated.

5. A roll of a plurality of glass sheet spacers carried by a common backing film; said spacers comprising resilient foam bodies having an adhesive-free portion adjacent an adhesive-carrying portion, adhesive provided at a first, adhesive-carrying, surface of said spacers between said adhesive-carrying portion and said backing film, said adhesive is removable adhesive and a second, adhesive free, surface extending generally parallel to said first surface but spaced from said first surface extending generally parallel to said first surface but spaced from said first surface by the thickness of said spacers, said second surface being adhesive-free; and wherein said bodies have adhesive-carrying surface which provides said adhesive-carrying portion and said adhesive-free portion, said adhesive-carrying surface being formed of a contiguous and continuous sheet of material; and wherein said backing film and associated spacers are formed into a roll with layers of spacers separated by layers of backing film, each said spacer having its adhesive-free portion at an edge thereof and comprising a finger-lift portion being bendable or rollable by a finger of a user, when said spacer is attached to a flat glass sheet surface, out of the plane of said adhesive carrying portion, thereby facilitating a rolling-off action and/or gripping of said finger-lift portion by the finger and thumb of a user for subsequent removal of said spacer from said surface.

6. A roll according to claim 5 wherein said backing film has generally parallel spaced apart first and second edge regions and a central region disposed between said side regions and wherein rows of longitudinally spaced pairs of aligned slits or perforation lines are provided through the backing film at said first and second side regions, each pair of slits or perforation lines comprising one slit or perforation line at said first side edge region and another slit or perforation lines at said second side edge region, the slits or perforation line of a pair extending towards each other on the same line transverse to the side edges of said first and second side edge regions, and wherein said central region of said backing film is unslit and unperforated.

7. A spacer on a backing film, said glass sheet comprising a resilient foam body spacer having a continuous unstepped adhesive-carrying surface having an adhesive free portion adjacent an adhesive-carrying portion, said adhesive free portion and said adhesive-carrying portion being made of the same material, adhesive provided at said adhesive-carrying surface of said spacer between said adhesive-carrying portion and said backing film said adhesive is removable adhesive, and a second surface extending generally parallel to said first surface but spaced from said first surface by the thickness of said spacers, said second surface being adhesive free, each said spacer comprising a strip having an elongate length and wherein said adhesive-carrying portion extends substantially parallel to the elongate direction of said spacer strip and said adhesive-free portion comprises at an elongate edge of said spacer strip, each said spacer having its adhesive-free portion comprising a finger-lift portion thereof being bendable or rollable upwards by a finger of a user, when said spacer is attached to a flat glass sheet surface, out of the plane of said adhesive carrying portion, thereby facilitating a rolling-off action and/or gripping of the finger-lift portion and subsequent removal of said spacer from said surface.

8. A compression-resistant glass sheet spacer for spacing sheets of glass from each other, the spacer having a body of resilient foam, and said body having an adhesive carrying face and an adhesive-free face spaced from and parallel to said adhesive carrying face; and wherein said adhesive carrying face has an adhesive carrying portion coated with a removable adhesive, and an adhesive free portion to the side of said adhesive carrying portion, said adhesive-free portion is located at an edge of said glass sheet spacer, and wherein a part of said body having said adhesive free portion comprises a finger-lift portion, said body at said finger-lift portion being flexible enough such that when said spacer is attached to a flat glass surface in use with said adhesive contacting the glass, a person can bend with a finger said finger-lift portion out of the plane or part of the plane of said adhesive carrying portion of said adhesive-carrying face, away from the surface of the glass, thereby facilitating a rolling-off action or gripping of said finger-lift portion for removal of said spacer from the glass.

9. A spacer according to claim 8 wherein said adhesive-carrying portion comprises a central region of said spacer and wherein said finger-lift portion comprises a lateral edge region of said spacer.

10. A spacer according to claim 8 wherein said adhesive-carrying portion has at least one stripe of adhesive on it.

11. A spacer according to claim 9 wherein said adhesive-carrying portion has at least two stripes of adhesive on it.

12. A spacer according to claim 8 wherein said adhesive-carrying portion comprises a central island portion of the adhesive-carrying face, anew said adhesive-free portion comprises a surrounding peripheral edge portion of said adhesive carrying face, there being adhesive free portion surrounding the adhesive-carrying portion.

13. A spacer according to claim 8 having a releasable backing film extending over said adhesive-carrying face and releasably attached to said adhesive-carrying face by said adhesive.

14. A spacer according to claim 8 wherein said body of said spacer comprises a unitary body of uniform thickness.

15. A spacer according to claim 8 wherein said body has a rectangular shape and wherein said adhesive free face and said adhesive carrying face are spaced apart by the thickness of the spacer.

16. A sheet of spacers, each spacer being in accordance with claim 8 and each spacer being attached to a common backing sheet via the adhesive of each spacer.

17. A sheet according to claim 16 formed into a roll.

18. A compression-resistant glass sheet spacer for spacing sheets of glass from each other, the spacer comprising a resilient body having an adhesive carrying face and an adhesive-free face spaced from and parallel to said adhesive carrying face; and wherein said adhesive carrying face has an adhesive carrying portion coated with an adhesive, and a removable adhesive free portion to the side of said adhesive carrying portion, said adhesive-free portion is located at an edge of said class sheet spacer, and wherein a part of said body having said adhesive free portion comprises a finger-lift portion, said body at said finger-lift portion being flexible enough such that when said spacers are attached to a flat glass surface in use with said adhesive contacting the glass, a person can bend with a finger said finger-lift portion out of the plane or part of the plane of said adhesive carrying portion of said adhesive-carrying face, away from the surface of the glass whilst said adhesive carrying portion is still in contact with the glass, thereby facilitating a rolling-off or gripping of said finger-lift portion for removal of said spacer from the glass.

19. A compression-resistant glass sheet spacer for spacing a stack of articles from each other, the spacer having a resilient foam body that is partially compressible in use, and said body having an adhesive carrying face and an adhesive-free face spaced from and parallel to said adhesive carrying face; and wherein said adhesive carrying face has an adhesive carrying portion coated with an adhesive, a removable adhesive free portion to the side of said adhesive carrying portion, said adhesive-free portion is located at an edge of said glass sheet spacer, and wherein said body is flexible such that said adhesive free portion comprises a finger-lift portion, said body at said finger-lift portion being flexible enough such that when said spacers are attached to a flat article in use with said adhesive contacting the article, a person can bend with a finger said finger-lift portion out of the plane or part of the plane of said adhesive carrying portion of said adhesive-carrying face, away from the surface of the article, thereby facilitating a rolling-off action or gripping of said finger-lift portion for removal of said spacer from the article.

\* \* \* \* \*